US 12,097,771 B2

(12) United States Patent
Worley et al.

(10) Patent No.: US 12,097,771 B2
(45) Date of Patent: *Sep. 24, 2024

(54) VEHICLE ENERGY CONTROL SYSTEM AND METHOD OF CONTROLLING ENERGY FOR A VEHICLE HAVING A WORK MEMBER

(71) Applicant: DEERE & COMPANY, Moline, IL (US)

(72) Inventors: Stacy K. Worley, Coffeyville, KS (US); Briton T. Eastman, Coffeyville, KS (US); Douglas J. Duff, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,939

(22) Filed: Dec. 20, 2023

(65) Prior Publication Data

US 2024/0157811 A1    May 16, 2024

Related U.S. Application Data

(63) Continuation of application No. 17/073,463, filed on Oct. 19, 2020, now Pat. No. 11,890,947.

(51) Int. Cl.
*B60L 15/20* (2006.01)
*B60K 35/00* (2006.01)
(Continued)

(52) U.S. Cl.
CPC .......... *B60L 15/2009* (2013.01); *B60K 35/00* (2013.01); *B60L 7/18* (2013.01);
(Continued)

(58) Field of Classification Search
CPC ........ B60L 15/2009; B60L 7/18; B60L 50/60; B60L 2240/10; B60L 2250/00;
(Continued)

(56) References Cited

U.S. PATENT DOCUMENTS 4,986,086 A    1/1991 de Langavant
6,116,368 A    9/2000 Lyons et al.
(Continued)

FOREIGN PATENT DOCUMENTS

DE    102018132785 A1    6/2020
EP          2840643 A1    2/2015

OTHER PUBLICATIONS

German Search Report issued in application No. DE102021209186.5 dated May 19, 2022 (12 pages).
Image of Komatsu HD 605-7, retrieved on May 19, 2022, pp. 1-3.

*Primary Examiner* — Muhammad Shafi

(57) ABSTRACT

A work vehicle is configured to perform an activity in a work area. The work vehicle includes a chassis, a plurality of ground engaging members coupled to the chassis for movement of the chassis in the work area, a generator configured to generate energy from performance of the activity of the work vehicle in the work area, an energy storage device connected to the generator to store energy generated by the generator and configured to be charged to an initial charge, a work member, and a controller configured to establish an initial charge setting corresponding to the initial charge of the energy storage device based on at least one anticipated activity input of the work vehicle.

18 Claims, 3 Drawing Sheets

(51) Int. Cl.
    *B60L 7/18*     (2006.01)
    *B60L 50/60*     (2019.01)
    *B62D 21/02*     (2006.01)
    *B60K 35/10*     (2024.01)

(52) U.S. Cl.
    CPC .............. *B60L 50/60* (2019.02); *B62D 21/02* (2013.01); *B60K 35/10* (2024.01); *B60L 2240/10* (2013.01); *B60L 2250/00* (2013.01)

(58) Field of Classification Search
    CPC .... B60L 1/20; B60L 2200/40; B60L 2260/50; B60K 35/00; B60K 2370/12; B60K 2370/169; B62D 21/02; Y02T 10/72; Y02T 10/70; B60Y 2200/41; B60W 30/18127; B60W 2555/40
    USPC .......................................................... 701/22
    See application file for complete search history.

(56) References Cited

U.S. PATENT DOCUMENTS

| | | | |
|---|---|---|---|
| 9,751,424 | B2 | 9/2017 | Crombez |
| 10,115,164 | B1* | 10/2018 | Binion .................. B60W 50/14 |
| 2005/0066738 | A1 | 3/2005 | Moore |
| 2012/0130576 | A1 | 5/2012 | Sugiyama et al. |
| 2015/0039163 | A1 | 2/2015 | West |
| 2016/0144720 | A1 | 5/2016 | Nakabayashi et al. |
| 2016/0183447 | A1* | 6/2016 | Buhler .................. G06Q 50/02 |
| | | | 701/50 |
| 2018/0065621 | A1* | 3/2018 | Merkle .................. B60L 50/15 |
| 2018/0243772 | A1 | 8/2018 | Davis et al. |
| 2019/0244382 | A1* | 8/2019 | Parrott .................... G01F 17/00 |
| 2020/0178049 | A1* | 6/2020 | Suleman ............... H04W 12/64 |
| 2020/0181885 | A1 | 6/2020 | Mollick |
| 2020/0375106 | A1 | 12/2020 | Seiders, Jr. et al. |

* cited by examiner

VEHICLE ENERGY CONTROL SYSTEM AND METHOD OF CONTROLLING ENERGY FOR A VEHICLE HAVING A WORK MEMBER

CROSS-REFERENCE TO RELATED APPLICATIONS

The present application is a continuation application of U.S. patent application Ser. No. 17/073,463, entitled "Vehicle Energy Control System and Method of Controlling Energy for a Vehicle" and filed at the United States Patent and Trademark Office on Oct. 19, 2020, now issued as U.S. Pat. No. 11,890,947, the content of which is incorporated herein by reference in its entirety.

BACKGROUND

Vehicles, such as construction, agriculture, utility, and other work vehicles, operate in work areas to accomplish such tasks as earth moving, digging, pulling, harvesting, hauling, and/or other activities or tasks with occasional or frequent movement of the vehicle across the work area, including movement to higher or lower elevations within the work area. Such tasks and activities may involve utilizing fuel and/or stored energy for movement of the work vehicle, movement or actuation of an attachment of the work vehicle, and/or performance of other activities by the work vehicle in the work area.

A work vehicle may include one or more energy recovery or regeneration systems or functions in order to increase efficiency of the work vehicle, reduce fuel or energy consumption of the work vehicle, and/or reduce vehicle emissions. Such energy recovery or regeneration systems may include, in non-limiting examples, an energy storage device, such as at least one battery, accumulator, and/or tank in an electrical, hydraulic, and/or pneumatic energy regeneration system. The energy storage device is charged to a maximum charge to provide primary or supplemental energy to the work vehicle for performance of activities.

SUMMARY

Various aspects of examples of the present disclosure are set out in the claims.

In an embodiment of the present disclosure, a work vehicle is configured to perform an activity in a work area. The work vehicle includes a chassis, a plurality of ground engaging members coupled to the chassis for movement of the chassis in the work area, a generator configured to generate energy from performance of the activity of the work vehicle in the work area, an energy storage device connected to the generator to store energy generated by the generator and configured to be charged to an initial charge, and a controller configured to establish an initial charge setting corresponding to the initial charge of the energy storage device based on at least one anticipated activity input of the work vehicle.

The generator may be coupled to at least one of the plurality of ground engaging members and configured to regeneratively brake the work vehicle via the at least one of the plurality of ground engaging members, the at least one anticipated activity input of the work vehicle may comprise an anticipated regenerative braking amount of the work vehicle. The work vehicle may further comprise a work member configured to perform at least one activity in the work area, wherein the generator may be connected to the work member and may be configured to generate energy from movement of the work member relative to the chassis, the at least one anticipated activity input of the work vehicle may comprise an anticipated energy generation amount of the generator from the movement of the work member. The work vehicle may comprise an operator interface in communication with the controller and configured to receive an operator input, the at least one anticipated activity input may comprise the operator input. The operator input may originate from at least one of onboard the work vehicle and offboard the work vehicle. The work vehicle may comprise a vehicle position sensor in communication with the controller and configured to determine a vehicle position, the at least one anticipated activity input may comprise the vehicle position. The work vehicle may further comprise a data storage device connected to the vehicle position sensor and configured to store vehicle position data, the at least one anticipated activity input may comprise the vehicle position data. The vehicle position sensor may comprise a vehicle elevation sensor in communication with the controller and configured to determine a vehicle elevation, the at least one anticipated activity input may comprise the vehicle elevation. The controller may be configured to establish the initial charge setting as less than a maximum charge based on the at least one anticipated activity input of the work vehicle comprising anticipated energy generation by the generator from performance of the activity of the work vehicle in the work area. The controller may be configured to establish the initial charge setting as proportionally inverse to an anticipated energy generation by the generator from performance of the activity of the work vehicle in the work area.

In an embodiment of the present disclosure, a method of controlling energy for an energy storage device of a work vehicle includes receiving at least one anticipated activity input of the work vehicle corresponding to an anticipated activity of the work vehicle in a work area, establishing an initial charge setting corresponding to an initial charge of the energy storage device based on the at least one anticipated activity input, charging the energy storage device to the initial charge, generating energy in the work area by performing the anticipated activity in the work area with the work vehicle, and storing the generated energy in the energy storage device.

The method may further include charging the energy storage device up to the initial charge setting before generating energy in the work area by performing the anticipated activity in the work area with the work vehicle. Generating energy in the work area may comprise regeneratively braking the work vehicle via at least one of the plurality of ground engaging members, the at least one anticipated activity input of the work vehicle may comprise an anticipated regenerative braking amount of the work vehicle. Generating energy in the work area may comprise generating energy from movement of a work member relative to a chassis of the work vehicle, the at least one anticipated activity input of the work vehicle may comprise an anticipated energy generation amount from the movement of the work member. The method may further comprise receiving an operator input from an operator interface, the at least one anticipated activity input may comprise the operator input. The method may further comprise determining a vehicle position, the at least one anticipated activity input may comprise the vehicle position. The method may further comprise storing historical vehicle position data, the at least one anticipated activity input may comprise the vehicle position data. The method may further comprise storing a vehicle activity plan of the work vehicle in the work area, the at least one anticipated activity input may comprise the vehicle activity plan. Establishing the initial charge setting may comprise establishing the initial charge setting as being proportionally inverse to an anticipated energy generation from performance of the anticipated activity in the work area with the work vehicle.

In an embodiment of the present disclosure, a vehicle energy control system for a vehicle in a work area includes a generated energy source received from onboard the vehicle and configured to provide energy to the vehicle from performance of an activity of the vehicle in the work area, an energy storing source connected to the generated energy source to store energy up to a maximum charge of the energy storing source, and a controller configured to establish an initial charge setting corresponding to an initial charge of the energy storing source prior to performance of the activity of the vehicle in the work area that is less than the maximum charge, the initial charge setting being based on at least one anticipated activity input of the work vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
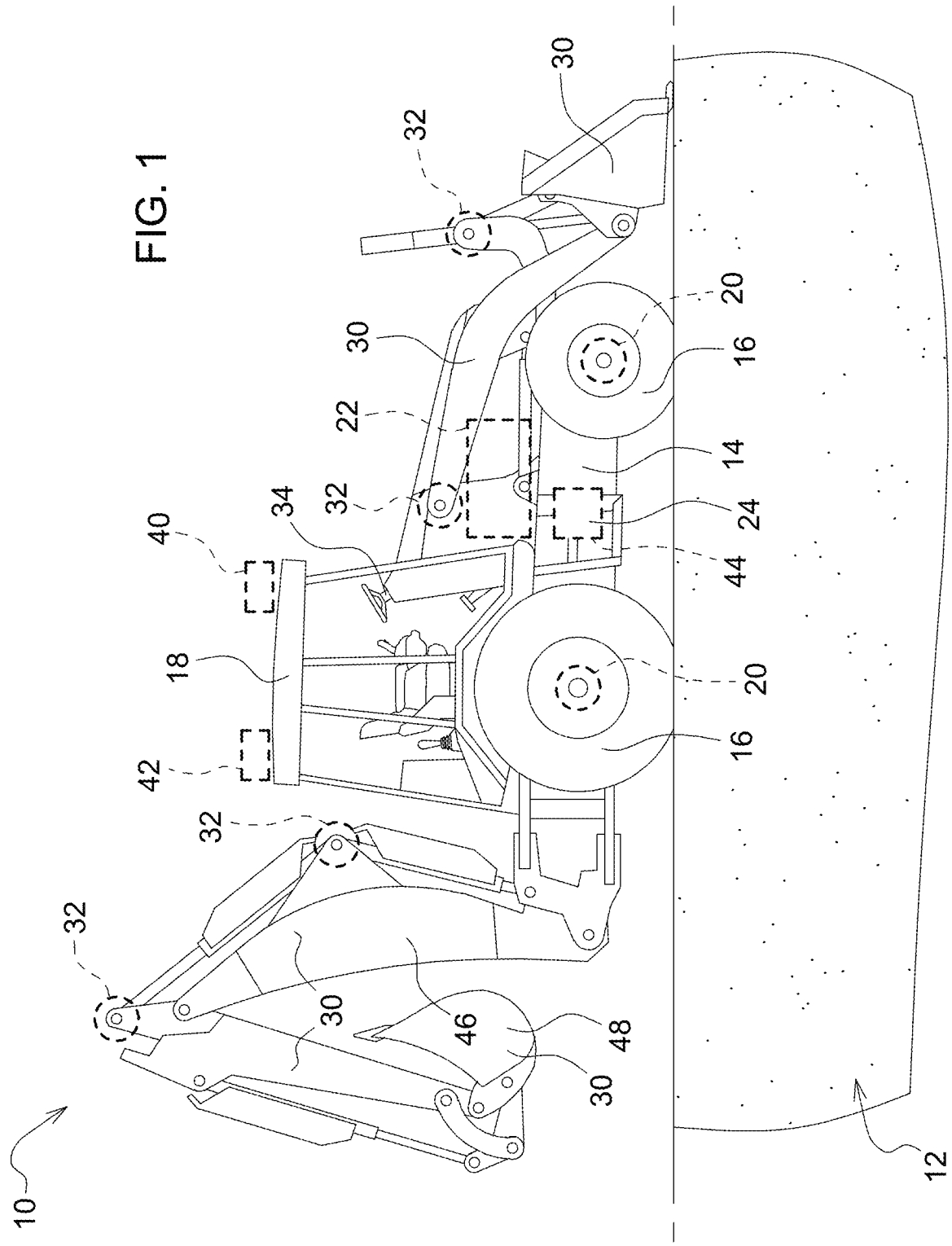
FIG. 1 illustrates a work vehicle in accordance with an embodiment of the present disclosure.
Figure 2:
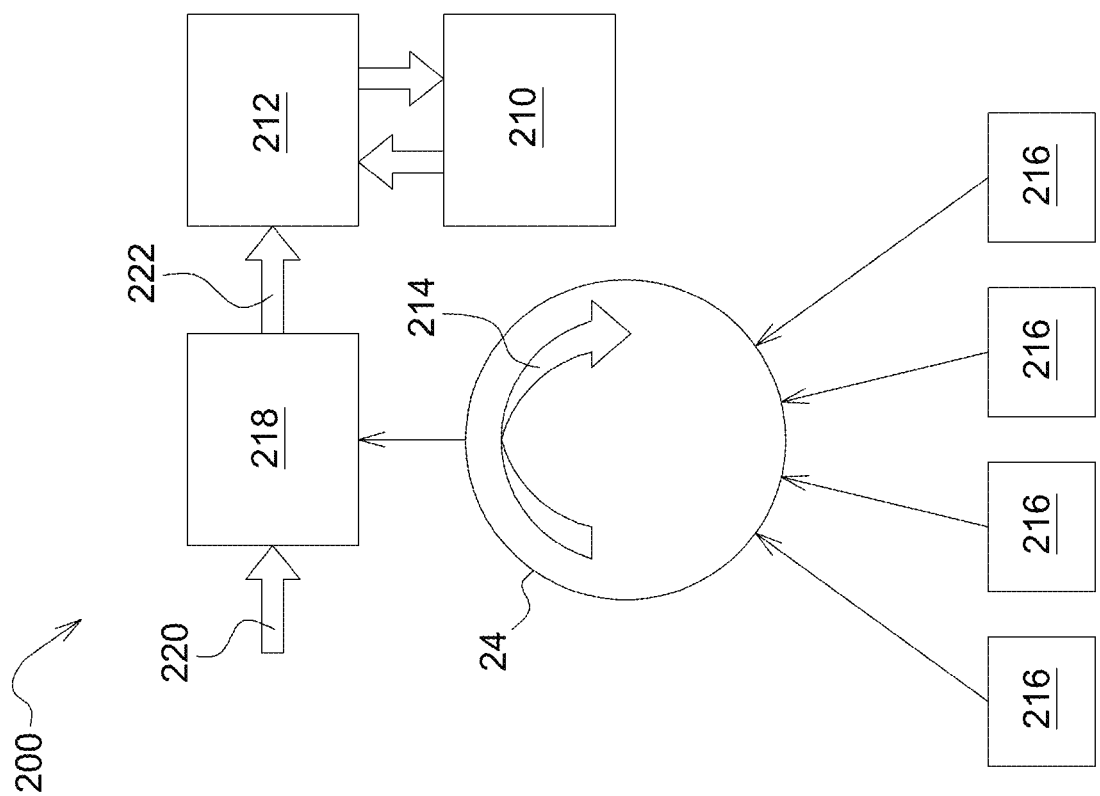
FIG. 2 illustrates a vehicle energy control system in accordance with an embodiment of the present disclosure.
Figure 3:
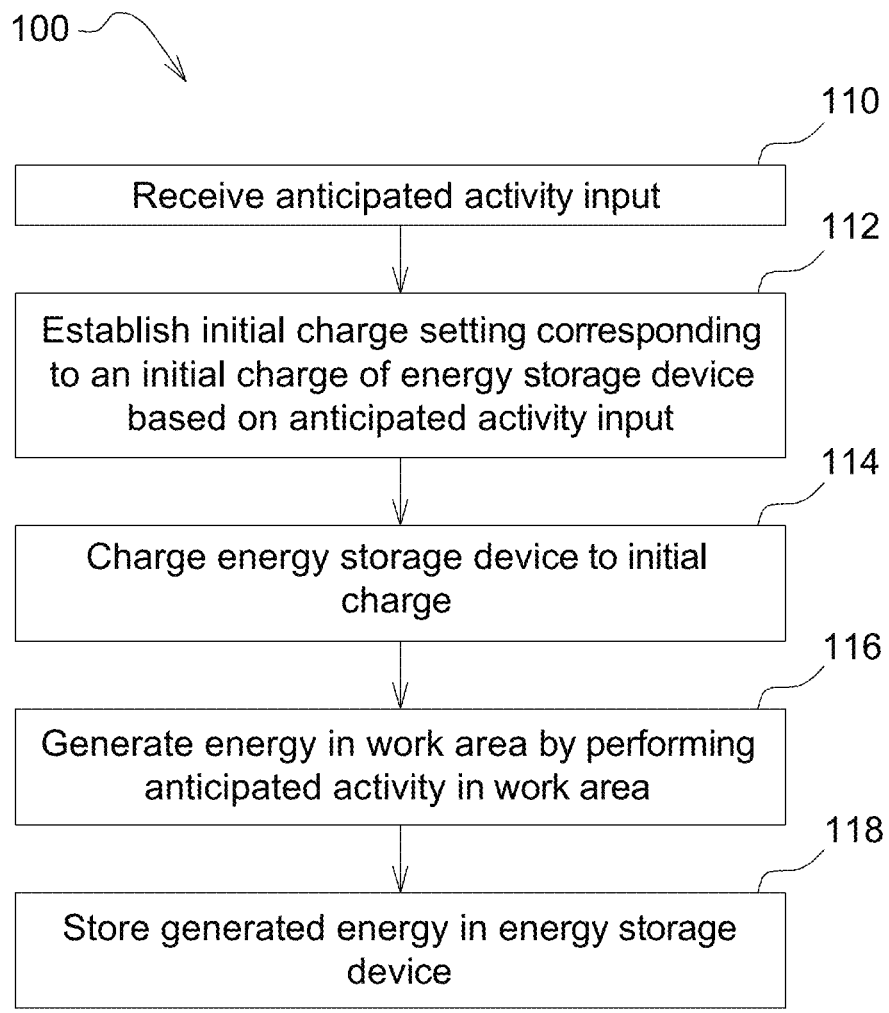
FIG. 3 illustrates a method of controlling energy for an energy storage device of a work vehicle in accordance with an embodiment of the present disclosure.

At least one embodiment of the subject matter of this disclosure is understood by referring to FIGS. 1 through 3 of the drawings.

Referring now to FIG. 1, a vehicle 10 is illustrated in accordance with an embodiment of the present disclosure. The vehicle 10 illustrated in FIG. 1 is a backhoe, but the vehicle 10 of one or more embodiments of the present disclosure is a work vehicle, such as a wheel loader, a dozer, a motor grader, or another construction vehicle to name non-limiting examples, an agricultural work vehicle, a utility vehicle, or another off-road or work vehicle configured or capable of performing one or more activities in a work area 12. Further, the vehicle 10 of the various embodiments of the present disclosure includes and may be referred to herein as the work vehicle 10 or the vehicle 10. The work vehicle 10 in the illustrated embodiment is an electric vehicle to include an electric powertrain with at least one electric machine utilized for vehicle propulsion, but the work vehicle 10 of other embodiments may be a hybrid powertrain and include a power plant, such as a diesel or other internal combustion engine having a fuel source and/or an electric, hydraulic, and/or pneumatic motor and/or actuator having an electrical source or high pressure fluid source.

The work vehicle 10 in the illustrated embodiment further includes a chassis 14 and one or more ground engaging members 16 coupled to the chassis 14 for movement of the chassis 14 in the work area 12. The ground engaging members 16 of the work vehicle 10 shown in FIG. 1 include wheels. In one or more additional embodiments, the ground engaging members 16 include one or more tracks and/or other rotatable or otherwise movable members.

The work vehicle 10 of one or more embodiments includes an operator station 18 connected to the chassis 14 and configured to allow an operator to control the work vehicle 10 and interface with the work vehicle 10 and other vehicles and personnel in the work area 12. In additional embodiments not shown, the operator station 18 is located remotely or away from the work vehicle 10, in the work area 12 or outside of the work area 12, and/or the operator is able to remotely operate the work vehicle 10 and/or the work vehicle 10 operates partially or fully autonomously.

The vehicle 10 of FIG. 1 is configured to perform one or more activities in the work area 12. Reference to performance of the activity in the work area 12 or one or more activity inputs includes any one or multiple activities and/or inputs in the work area 12. The activity may include operating the vehicle 10 across the work area 12, including traveling to higher or lower locations in the work area 12. The activity of additional embodiments may include any one or more earth moving, hauling, pulling, pushing, including pushing or pulling one or more attachments, implements, and/or other vehicles, harvesting, digging, lifting, carrying, and/or other activities and/or tasks performed by construction, agricultural, utility, and/or other vehicles or machinery in the work area 12. The activity inputs described in various embodiments include any information, setting, or other input supplied to the controller 24 or other part of the vehicle 10 that relate to the activity or anticipated activity of the work vehicle 10 in the work area 12.

The vehicle 10 includes at least one generator 20 configured to generate energy from performance of the activity of the work vehicle 10 in the work area 12. The generator 20 includes a motor-generator in an embodiment, but may include any rotary, linear, or other generating device capable of generating energy directly or indirectly from movement or displacement, including electrical, hydraulic, and/or pneumatic energy generation.

In an embodiment, the generator is coupled to at least one of the ground engaging members 16 and is configured to regeneratively brake the work vehicle 10 via the at least one of the ground engaging members 16. One or more anticipated activity input(s) of the work vehicle 10 include an anticipated regenerative braking amount of the work vehicle 10. In the illustrated embodiment, the generator 20 is a motor-generator configured to drive one or more of the ground engaging members 16 and generate energy from the rotation, movement, and/or displacement of the ground engaging member(s) 16.

In an embodiment, the work vehicle 10 includes a work member 30 configured to perform at least one activity in the work area 12. In non-limiting examples, the work member 30 includes a boom 46 or other arm or connecting member, a bucket 48 or other blade or engaging member, a bed or other carrying or hauling member (not shown), a drum or other ground-engaging member (not shown), and/or any member of a pushed or pulled attachment or implement. Further, in some embodiments, the work member 30 is or includes one or more hydraulic, pneumatic, or other type of cylinder or actuator coupled to or otherwise connected with such work member(s) 30 listed herein.

At least one generator 20, such as work member generator 32, is connected to the work member 30 and is configured to generate energy from movement of the work member 30 relative to the chassis 14. The generator 20 and the work member generator 32, where capable, may be used interchangeably in the various embodiments herein. The anticipated activity input of the work vehicle 10 includes an anticipated energy generation amount of the generator 32 from the movement of the work member 30. In the illustrated embodiment, the generator 32 is a motor-generator that moves the work member 30 relative to the chassis 14 or another portion of the work vehicle 10, and the generator 32 generates energy from the movement of the work member 30 relative to the chassis 14 or another portion of the work vehicle 10.

The vehicle 10 further includes an energy storage device 22 connected to the generator 20 to store energy generated by the generator 20. The energy storage device 22 may include one or multiple devices capable of storing electrical, mechanical, hydraulic, and/or pneumatic energy. The energy storage device 22 in the illustrated embodiment is an electric battery, but may include one or more other or additional storage devices, such as, in non-limiting examples, a hydraulic accumulator, a mechanical flywheel or spring, pneumatic air tank, and/or another device capable of storing energy. The energy storage device 22 is configured to be charged to an initial charge. The energy storage device 22 of one or more embodiments is charged during a charging event that occurs when the vehicle 10 is inactive, immobile, or otherwise not performing any activities in the work area 12. The initial charge in an embodiment is the amount of energy being stored in the energy storage device 22 before the work vehicle 10 performs the activity in the work area 12. In additional embodiments, the initial charge is the amount of energy being stored in the energy storage device 22 before a beginning of a work cycle of the vehicle 10, before movement of the vehicle 10 from a charging location in the work area 12, and/or immediately after such charging terminates.

The vehicle 10 includes a controller 24 configured to establish an initial charge setting corresponding to the initial charge of the energy storage device 22. The initial charge setting is based on one or more anticipated activity input(s) of the work vehicle 10. In at least one embodiment, the initial charge setting determines and/or is equal to the initial charge of the energy storage device 22.

The controller 24 of an embodiment establishes the initial charge setting as less than a maximum charge based on one or more anticipated activity inputs of the work vehicle 10. The maximum charge in various embodiments includes reaching full capacity of the energy storage device 22, reaching the point during charging where charging stops due to the capacity of the energy storage device 22, and/or reaching substantially maximum charge of the energy storage device 22. The substantially maximum charge in a non-limiting example is 95% of full capacity of the energy storage device 22 but may include any other percentages. The anticipated activity input(s) in an embodiment refers to, corresponds to, or includes anticipated energy generation by the generator 20 and/or the work member generator 32 from performance of the activity of the work vehicle 10 in the work area 12. In an embodiment, the controller 24 establishes the initial charge setting as proportionally inverse to an anticipated energy generation by the generator 20 and/or the work member generator 32 from performance of the activity of the work vehicle 10 in the work area 12. In other words, the initial charge setting is established at a lower level with a higher level of anticipated energy generation, and the initial charge setting is established at a higher level with a lower level of anticipated energy generation.

In one or more embodiments, the anticipated energy generation and/or the anticipated activity input(s) are associated with or are limited to the initial activity or activities of the work vehicle 10 immediately after charging the energy storage device 22 or beginning activity in the work area 10. In a non-limiting example, the anticipated energy generation and/or the anticipated activity input(s) may include an initial travel route to a lower elevation, thereby anticipating energy generation by the generator 20 until the work vehicle 10 reaches the lower elevation location where it may no longer generate energy for storage in the energy storage device 22. In such an example, the anticipated energy generation and/or the anticipated activity input(s) is limited to this initial or immediately subsequent activity because the work vehicle 10 will then perform activities requiring the use of and depletion of energy from the energy storage device 22 and not the generation of energy from an activity.

The vehicle 10 further includes an operator interface 34 in communication with the controller 24 and configured to receive an operator input. The anticipated activity input(s) includes the operator input. In an embodiment, the operator input originates from onboard the work vehicle 10, such as via operator engagement with the operator interface 34, and offboard the work vehicle, such as remote control of the work vehicle 10.

The anticipated activity input(s) of the vehicle 10 are transmitted or provided to or determined by the controller 24 manually and/or via wired and/or wireless signal. In an illustrative example of a manual transmission of the anticipated activity input to the controller 24, the operator of the vehicle 10 may perceive or otherwise know or estimate the expected or anticipated activity of the vehicle 10 during or before charging of the energy storage device 22. The operator may manually adjust or set an initial charge setting on the operator interface 34 to allow the controller 24 to establish the initial charge setting corresponding to the initial charge of the energy storage device 22 based on the anticipated activity input provided by the operator.

In additional embodiments, the controller 24 receives the anticipated activity input(s) via wired or wireless signal transmission and/or determines the input via signal from one or more sensors or other modules onboard or offboard the work vehicle 10. As shown in FIG. 1, in one or more embodiments of the present disclosure, the work vehicle 10 includes a vehicle position sensor 40, such as a global positioning system (GPS) transceiver, accelerometer, inertial measurement unit, or rotary wheel/axle encoder, in communication with the controller 24. The vehicle position sensor 40 determines a relative or absolute vehicle position or the position of the work vehicle 10 in the work area 12. At least one of the anticipated activity inputs includes the vehicle position in an embodiment, such as determined by the vehicle position sensor 40.

In at least one further embodiment, the vehicle position sensor 40 includes a vehicle elevation sensor 42 in communication with the controller 24. The vehicle elevation sensor 42 determines a vehicle elevation. At least one of the anticipated activity inputs includes the vehicle elevation in an embodiment, such as determined by the vehicle elevation sensor 42. The vehicle position sensor 40 and/or the vehicle elevation sensor 42 may provide the anticipated activity input to the controller 24 as indicating that the vehicle 10 is located at a higher location relative to a stored or known task or activity, and the controller 24 then establishes the initial charge based on this anticipated activity input that includes expected energy generation from the vehicle 10 traveling to a lower elevation after charging.

In an embodiment, the work vehicle 10 includes a data storage device 44 connected to the vehicle position sensor 40 and/or another device or portion of the work vehicle 10. The data storage device 44 stores vehicle position data and/or other data for access by the controller 24. The anticipated activity input(s) include the vehicle position data in an embodiment. In one or more embodiments, the data storage device 44 is connected to one or more vehicle activity sensors or inputs, including without limitation any one or more boom, cylinder, actuator, or other member sensors or inputs described herein. The data storage device 44 of such embodiments may store vehicle and/or work member activity data from such devices or locations, including historical vehicle position data and/or historical work member data. The data storage device 44 may further receive, create in cooperation with a processor or a controller, and/or store data relating to one or more travel routes, path plans, manual, remotely-guided, or autonomously guided vehicle or work member tasks or activity instructions or commands, and/or other operating guidance or instructions. The anticipated activity input of one or more embodiments includes the vehicle activity data, including any one or more of the operating instructions and/or historical vehicle position and/or work member data, map(s) data, and/or path or activity plans and instructions. In a non-limiting example, the controller 24 may receive a path plan for a series of activities by the vehicle 10 before or upon energy storage charging that indicate an initial activity involving generation of energy by a work member, such as the lowering and unloading of a filled bucket of a front loader. The controller 24 in such a non-limiting example establishes the initial charge based on this anticipated activity input that includes expected energy generation from the vehicle 10 performing the activity that recovers energy to be stored in the energy storage device 22.

Any one or more anticipated activity input(s) include, in additional embodiments, further inputs that may affect the operation of the vehicle 10 and any of its work members 30 including, alone or in combination, and without limitation, one or more climate conditions or other physical conditions of the work area 12, a time of the day or year, the presence and activities of one or more other vehicles, personnel, or obstacles in the work area, and/or the learned driving behavior of the operator. Further, anticipated activity input(s) include, in additional embodiments, alone or in combination, and without limitation, the attachment or coupling of an implement or attachment, a setting or other condition of a work member such as a blade, bucket, boom, or actuator, and/or the operation, status, or completion of an activity by another vehicle or machine in the work area 12. In a non-limiting example, the controller 24 may establish the initial charge based on the anticipated activity inputs of initial descent by the work vehicle 10, as previously described, and the work vehicle 10 being attached to a trailer having a regenerative braking system supplying energy to the energy storage device 22.

The controller 24 of such embodiments may utilize such historical data, maps, and other anticipated activity inputs to synthesize predictive anticipated activity inputs to establish the initial charge. In another non-limiting example, the controller 24 may reference stored data tables or models with historical vehicle position data, a plan for the work area 12, and the charging location to determine that the remaining activity for the work area plan includes a regenerative task starting from the conclusion of charging. Accordingly, in such an example, the controller 24 creates or otherwise references a predictive anticipated activity input of the remaining task to appropriately establish the initial charge.

Referring now to FIG. 2 with continuing reference to FIG. 1, a vehicle energy control system 200 is provided in accordance with one or more embodiments for the vehicle 10 in the work area 12. Any one or more of the embodiments described for the control system 200 herein may be applied to any one or more of the embodiments of the work vehicle 10 herein, and vice versa. The control system 200 of one embodiment includes a generated energy source 210, such as the generator 20 or the work member generator 32, onboard the vehicle 10 to generate energy from performance of the activity of the vehicle 10 in the work area 12. The control system 200 further includes an energy storing source 212, such as the energy storage device 22, connected to the generated energy source 210 to store energy up to the maximum charge of the energy storing source 212. The control system 200 further includes the controller 24 to establish the initial charge setting 214, corresponding to an initial charge 222 of the energy storing source 212 prior to performance of the activity of the vehicle 10 in the work area 12, that is less than the maximum charge. In at least one embodiment, the initial charge setting is based on any one or more anticipated activity input(s) 216 of the work vehicle 10. The controller 24 of an embodiment controls a charging device 218 that is located onboard or offboard the vehicle 10 and receives energy from a charging energy source 220 for providing the initial charge 222 to the energy storing source 212. The charging energy source 220 that supplies the charging device 218 may include offboard electrical or other energy, such as grid-supplied alternating current electrical current in a non-limiting example, onboard electrical or other energy, such as an electrical generator or battery bank in non-limiting examples, and/or any combination thereof.

Referring now to FIG. 3, a method 100 of controlling energy for the energy storage device 22 of the work vehicle 10. The method 100 includes receiving, at step 110, one or more anticipated activity input(s) of the work vehicle 10 corresponding to the anticipated activity of the work vehicle 10 in the work area 12. The method 100 further includes establishing, at step 112, the initial charge setting corresponding to the initial charge of the energy storage device 22 based on the anticipated activity input(s). The method 100 further includes charging, at step 114, the energy storage device 22 to the initial charge. The method 100 further includes generating energy, at step 116, in the work area 12 by performing the anticipated activity in the work area 12 with the work vehicle 10. The method 100 further includes storing, at step 118, the generated energy in the energy storage device 22.

In one or more embodiments, the method 100 further includes charging the energy storage device 22 up to, and in at least one embodiment, no greater than, the initial charge setting before generating energy in the work area 12 by performing the anticipated activity in the work area 12 with the work vehicle 10 or before beginning to or performing the activity by the work vehicle 10 in the work area 10. The method 100 of an embodiment may include generating energy in the work area 12 by regeneratively braking the work vehicle 10 via one or more ground engaging members 16. The anticipated activity input of the work vehicle 10 of an embodiment includes an anticipated regenerative braking amount of the work vehicle 10. The method 100 of additional embodiments may further include generating energy in the work area 12 by generating energy from movement of the work member 30 relative to the chassis 14 of the work vehicle 10. The anticipated activity input of the work vehicle 10 includes an anticipated energy generation amount from the movement of the work member 30. The method 100 of embodiments may include any combination of such anticipated activities and anticipated activity inputs.

The method 100 of additional embodiments may further include receiving the operator input from the operator interface. The anticipated activity input includes, in an embodiment, the operator input. The method 100 of an embodiment includes determining the vehicle position wherein the anticipated activity input includes the vehicle position. An embodiment of the method 100 further includes storing historical vehicle position data wherein the anticipated activity input includes the vehicle position data. An embodiment of the method 100 further includes storing a vehicle activity plan of the work vehicle 10 in the work area 12 wherein the anticipated activity input includes the vehicle activity plan. Establishing the initial charge setting in an embodiment of the method 100 includes establishing the initial charge setting as being proportionally inverse to the anticipated energy generation from performance of the anticipated activity in the work area 12 with the work vehicle 10.

Any feature, step, function, or structure described with regard to the embodiments of the work vehicle 10 and/or the control system 200 is/are applied to the method 100, and vice versa, in additional embodiments of the present disclosure.

Without in any way limiting the scope, interpretation, or application of the claims appearing below, it will be appreciated that the work vehicle 10, the method 100, and the control system 200 reduce energy consumption by preventing the overcharging of the energy storage device 22 when it is anticipated that the work vehicle 10 will be performing one or more activities that will allow generation of energy for storage with the energy storage device 22. Further, the vehicle 10, the method 100, and the control system 200 allow the vehicle 10 to utilize an energy storage device having a smaller capacity as the controller 24 is able to selectively control the amount of charging that is needed based on the anticipated activity. Such selective control as provided by the vehicle 10, control system 200, and method 100 herein further increases the life of the energy storage device 22, such as by preventing overcharging the energy storage device 22, reducing unnecessary charging or charging cycles of the energy storage device 22, and keeping the state of charge of the energy storage device 22 within an optimal range. Finally, the vehicle 10, control system 200, and method 100 increase the life of wear parts, such as service brakes and other hydraulic and/or mechanical components, by utilizing regeneration from vehicle or work member displacement or movement rather than using such wear parts, such as for slowing the vehicle 10 or damping or retarding movement of the vehicle 10 and/or one or more work members 30.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A work vehicle configured to perform an activity in a work area, the work vehicle comprising:
   a chassis;
   a plurality of ground engaging members coupled to the chassis for movement of the chassis in the work area;
   a generator configured to generate energy from performance of the activity of the work vehicle in the work area;
   an energy storage device connected to the generator to store energy generated by the generator and configured to be charged to an initial charge;
   a work member configured to perform at least one activity in the work area, wherein the generator is connected to the work member and is configured to generate energy from movement of the work member relative to the chassis; and
   a controller configured to establish an initial charge setting corresponding to the initial charge of the energy storage device based on at least one anticipated activity input of the work vehicle, the at least one anticipated activity input of the work vehicle comprising an anticipated energy generation amount of the generator from the movement of the work member.

2. The work vehicle of claim 1, wherein the generator is coupled to at least one of the plurality of ground engaging members as the work member and configured to regeneratively brake the work vehicle via the at least one of the plurality of ground engaging members, the at least one anticipated activity input of the work vehicle comprising an anticipated regenerative braking amount of the work vehicle.

3. The work vehicle of claim 1, further comprising an operator interface in communication with the controller and configured to receive an operator input, the at least one anticipated activity input comprising the operator input.

4. The work vehicle of claim 3, wherein the operator input originates from at least one of onboard the work vehicle and offboard the work vehicle.

5. The work vehicle of claim 1, further comprising a vehicle position sensor in communication with the controller and configured to determine a vehicle position, the at least one anticipated activity input comprising the vehicle position.

6. The work vehicle of claim 5, further comprising a data storage device connected to the vehicle position sensor and configured to store vehicle position data, the at least one anticipated activity input comprising the vehicle position data.

7. The work vehicle of claim 5, wherein the vehicle position sensor comprises a vehicle elevation sensor in communication with the controller and configured to determine a vehicle elevation, the at least one anticipated activity input comprising the vehicle elevation.

8. The work vehicle of claim 1, wherein the controller is configured to establish the initial charge setting as less than a maximum charge based on the at least one anticipated activity input of the work vehicle comprising anticipated energy generation by the generator from performance of the activity of the work vehicle in the work area.

9. The work vehicle of claim 1, wherein the controller is configured to establish the initial charge setting as proportionally inverse to an anticipated energy generation by the generator from performance of the activity of the work vehicle in the work area.

10. A method of controlling energy for an energy storage device of a work vehicle, the method comprising:
    receiving at least one anticipated activity input of the work vehicle corresponding to an anticipated activity of the work vehicle in a work area;
    establishing an initial charge setting corresponding to an initial charge of the energy storage device based on the at least one anticipated activity input;
    charging the energy storage device to the initial charge;
    generating energy in the work area by performing the anticipated activity in the work area with the work vehicle as movement of a work member relative to a chassis of the work vehicle, the at least one anticipated activity input of the work vehicle comprising an anticipated energy generation amount from the movement of the work member; and
    storing the generated energy in the energy storage device.

11. The method of claim 10, further comprising:
    charging the energy storage device up to the initial charge setting before generating energy in the work area by performing the anticipated activity in the work area with the work vehicle.

12. The method of claim 10, wherein generating energy in the work area comprises regeneratively braking the work vehicle via at least one of the plurality of ground engaging members, the at least one anticipated activity input of the work vehicle comprising an anticipated regenerative braking amount of the work vehicle.

13. The method of claim 10, further comprising receiving an operator input from an operator interface, the at least one anticipated activity input comprising the operator input.

14. The method of claim 10, further comprising determining a vehicle position, the at least one anticipated activity input comprising the vehicle position.

15. The method of claim 14, further comprising storing historical vehicle position data, the at least one anticipated activity input comprising the vehicle position data.

16. The method of claim 14, further comprising storing a vehicle activity plan of the work vehicle in the work area, the at least one anticipated activity input comprising the vehicle activity plan.

17. The method of claim 10, wherein establishing the initial charge setting comprises establishing the initial charge setting as being proportionally inverse to an anticipated energy generation from performance of the anticipated activity in the work area with the work vehicle.

18. A vehicle energy control system for a vehicle in a work area, the control system comprising:
    a generated energy source received from a generator connected to a work member of the vehicle and configured to provide energy to the vehicle from movement of the work member during performance of an activity of the vehicle in the work area;
    an energy storing source connected to the generated energy source to store energy up to a maximum charge of the energy storing source; and
    a controller configured to establish an initial charge setting corresponding to an initial charge of the energy storing source prior to performance of the activity of the vehicle in the work area that is less than the maximum charge, the initial charge setting being based on at least one anticipated activity input of the work vehicle.

* * * * *